(12) United States Patent
Mais et al.

(10) Patent No.: US 8,752,420 B2
(45) Date of Patent: Jun. 17, 2014

(54) SENSOR SYSTEM FOR DETERMINING A PARAMETER OF A FLUID MEDIUM

(75) Inventors: Torsten Mais, Ludwigsburg (DE);
Erhard Renninger, Markgroeningen (DE); Christoph Gmelin, Stuttgart (DE); Oliver Hennig, Obersulm (DE)

(73) Assignee: Robert Bosch GmbH, Stuttgart (DE)

( * ) Notice: Subject to any disclaimer, the term of this patent is extended or adjusted under 35 U.S.C. 154(b) by 474 days.

(21) Appl. No.: 12/737,712

(22) PCT Filed: Jul. 27, 2009

(86) PCT No.: PCT/EP2009/059631
§ 371 (c)(1),
(2), (4) Date: Apr. 13, 2011

(87) PCT Pub. No.: WO2010/018055
PCT Pub. Date: Feb. 18, 2010

(65) Prior Publication Data
US 2011/0179858 A1    Jul. 28, 2011

(30) Foreign Application Priority Data
Aug. 11, 2008 (DE) .......................... 10 2008 041 145

(51) Int. Cl.
*G01M 15/04* (2006.01)

(52) U.S. Cl.
USPC ..................................................... 73/114.32

(58) Field of Classification Search
USPC ........ 73/170.15, 3, 4, 7, 111, 204.21, 114.34, 73/861.356, 198, 114.42, 861.52, 861.83, 73/861.65, 774, 170.11, 170.13, 170, 2, 73/510, 511; 111/14; 861/21, 22; 702/13
See application file for complete search history.

(56) References Cited

U.S. PATENT DOCUMENTS

| 3,840,051 | A | 10/1974 | Akashi et al. |
| 4,559,275 | A | 12/1985 | Matt et al. |
| 4,696,193 | A * | 9/1987 | Nanba et al. ................ 73/861.22 |
| 5,918,279 | A | 6/1999 | Hecht et al. |
| 6,619,114 | B1 * | 9/2003 | Lenzing et al. .............. 73/202.5 |
| 2010/0300187 | A1 | 12/2010 | Renninger et al. |

FOREIGN PATENT DOCUMENTS

| DE | 33 20 753 | 12/1983 |
| DE | 196 01 791 | 7/1997 |
| DE | 199 42 502 | 3/2001 |
| DE | 10 2007 056 888 | 5/2009 |
| EP | 0 458 998 | 12/1991 |
| JP | 59-9306 | 1/1984 |
| JP | 61-264216 | 11/1986 |

* cited by examiner

*Primary Examiner* — John Fitzgerald
(74) *Attorney, Agent, or Firm* — Kenyon & Kenyon LLP

(57) ABSTRACT

A sensor system for determining at least one parameter of a fluid medium which flows in a main flow direction, e.g., an intake air mass flowing through a flow pipe, includes at least one sensor situated in the fluid medium and at least one grating which is situated transversely to the main flow direction and which has at least one bar. On at least one surface over which the fluid medium flows, the bar has at least one shearing element which is designed to generate a region in the flow having a turbulent flow downstream from the shearing element.

10 Claims, 3 Drawing Sheets

SENSOR SYSTEM FOR DETERMINING A PARAMETER OF A FLUID MEDIUM

BACKGROUND OF THE INVENTION

1. Field of the Invention

The present invention relates to a device for measuring at least one parameter of a flowing fluid medium, e.g., a fluid medium flowing through a flow pipe.

2. Description of Related Art

In many processes, for example in the field of process engineering, chemistry and mechanical engineering, fluid media, in particular gas masses (such as an air mass) having certain properties (for example, temperature, pressure, flow velocity, mass flow, volumetric flow, etc.) must be supplied in a defined manner. These processes include, in particular, combustion processes which run under regulated conditions.

An important application example is the combustion of fuel in internal combustion engines of motor vehicles, in particular having subsequent catalytic exhaust gas treatment, in which a certain air mass per time unit (air mass flow) must be supplied in a regulated manner. Different types of sensors are used to measure the air mass flow rate. One sensor type known from the related art is the so-called hot film air mass meter (HFM), which is described, for example, in a specific embodiment in published German patent application document DE 196 01 791 A1. A sensor chip, which has a thin sensor diaphragm, for example a silicon sensor chip, is usually used in hot film air mass meters of this type. At least one heating resistor, which is surrounded by two or more temperature measuring resistors (temperature sensors), is typically situated on the sensor diaphragm. In an air flow which is conducted over the diaphragm, the temperature distribution changes, which, in turn, is detectable by the temperature measuring resistors and may be evaluated with the aid of a control and evaluation circuit. For example, an air mass flow may be determined from a difference in the resistance of the temperature measuring resistors. Various other variants of this sensor type are known from the related art. However, the present invention is not limited to the sensor type of the hot film air mass meter described, but instead may be used, in principle, for most types of sensors which are used as permanently installed sensors or as plug-in sensors in a flowing medium.

The disadvantage of the plug-in sensor designs described in the related art is that the described plug-in sensors in many cases cause problems relating to a pressure drop in the intake tract due to a flow resistance. In particular, this means that the signal reproducibility of the signals of sensors of this type is not optimal.

Many sensors, in particular hot film air mass meters, are in practice equipped with a grating or a grating combination. These gratings may be integrated, for example, into a flow pipe and are usually located a few centimeters upstream from the plug-in sensor or other sensor in the flow and have the function of equalizing the velocity profile in the flow pipe. Furthermore, gratings of this type have the function of removing a swirl, which is occasionally present, from the flow. The equalizing effect of the grating is achieved by its braking effect on the flow. At the same time, a small-scale turbulence is generated, which mixes fast and slow fluid and thereby contributes to a velocity compensation over the entire pipe cross section. This achieves the fact that the characteristic of the sensor (for example, a correlation between air mass and output frequency or output voltage) is nearly independent of the velocity profile of the in-flowing air.

An example of a sensor system having a grating is described in published German patent application document DE 199 42 502 A1. Herein, a measuring probe is situated in a line or a pipe body downstream from a protective grating which induces a deflection of the medium flow and deflects liquid particles. Longitudinal ribs or turbulators, which prevent uncontrolled vortex separation, may be provided downstream from the protective grating.

Many sensor systems, in particular air mass sensors, in combination with conventional gratings, for example plastic gratings having a mesh width between 4 mm and 7 mm and a mesh depth of 5 mm to 10 mm, unfavorably demonstrate comparatively poor reproducible characteristics in certain air mass ranges. Among other things, this problem is caused by laminar-turbulent transition of the flow at the individual grating bars. Since the transition response is highly sensitive to the most minute changes in the conditions, such as temperature, geometry, flow velocity or similar conditions, and these parameters are, as a rule, not entirely constantly present over the cross section of the flow tube, the flow is not precisely turbulent everywhere at the same time. This results in the fact that air mass areas exist where the flow state (laminar or turbulent) of the flow of the fluid medium downstream from the grating is not precisely defined and is comparatively difficult to reproduce. This uncertainty is reflected in the reproducibility of the characteristic of the sensor element.

BRIEF SUMMARY OF THE INVENTION

A sensor system for determining at least one parameter of a fluid medium flowing in a main flow direction is therefore proposed, which at least largely avoids the disadvantages of known sensor systems. A grating for use in a sensor system of this type is furthermore proposed.

One idea of the present invention is to cause the flow of the flowing fluid medium to be turbulent as early as possible, i.e., at very low flow velocities, and thereby to produce a distinct flow state. This is done by using an improved grating bar profile which ensures that the flow becomes turbulent comparatively rapidly, i.e., already at low flow velocities. As a result, a distinct, easily reproducible flow state prevails, and the velocity profile is effectively equalized by a greater exchange of pulses transversely to the flow direction. The flow sensitivity to changes in the velocity profile due to external influences, for example contamination of a filter element in an intake line upstream from the sensor system, is reduced thereby.

On the whole, more stable flows and higher reproducibility of the sensor signals may be generated with the aid of the proposed sensor system. Other flow-stabilizing measures, such as additional wire gratings, may preferably be dispensed with, so that the manufacturing costs of the proposed sensor system may also be reduced compared to conventional sensor systems. Naturally, however, other flow-stabilizing measures may nevertheless also be provided as an option. On the whole, the sensor system has a high signal quality compared to conventional sensor systems, in particular improved signal noise.

In principle, the sensor system is suitable for a plurality of aforementioned sensors and measurement principles as well as for a plurality of fluid media, for example gases and liquids. In principle a plurality of possible physical and/or chemical parameters may be measured, for example pressure, temperature, density, mass flow rate, volumetric flow rate and the like. Accordingly, the sensor system has at least one sensor which is adapted to the type of the one or more parameters to be measured. Without limiting other types of possible embodiments of the present invention, it is assumed below that the sensor includes a hot film air mass meter, as described, for example, in the aforementioned published German patent application document DE 196 01 791 A1 or in other cited publications according to the related art.

In principle, the fluid medium may flow at least largely freely in the main flow direction, the main flow direction being understood to mean the local flow direction of the medium in the area of the sensor system. However, this does not take into account local irregularities such as turbulences, so that the main flow direction is understood to mean the main transport direction in which the fluid medium is transported in the area of the sensor system. The fluid medium preferably flows through a flow pipe, it being possible for the sensor system to include, for example, a flow pipe segment having at least one housing into which the at least one sensor may be introduced (for example with the aid of at least one receptacle).

The sensor system furthermore has at least one grating having at least one bar which is situated transversely to the main flow direction. Multiple bars of this type are preferably provided, which may be oriented, for example parallel and/or at angles other than 0°, in relation to each other. A grating having crossing bars, for example similar to the related art described above, is also conceivable. The grating is preferably part of the aforementioned flow pipe segment, for example in the form of a removable part of the flow pipe segment. According to the present invention, in addition to the sensor system, a grating for use in a sensor system of this type is furthermore proposed, for which the embodiments described below and relating to the grating similarly apply.

The term "transversely to the flow direction" in the present case is preferably understood to be an angle of 90° between the bars and the main flow direction, deviations from 90° also being conceivable, however, for example deviations by no more than 20°. In this respect, the grating may correspond, for example entirely or partially, to the gratings known from the related art, for example the gratings known from DE 199 42 502 A1.

The bars of the grating may be oriented parallel to the main flow direction, for example by their surfaces over which the medium flows, which is preferred within the framework of the present invention. However, deviations from this parallelism are also possible, for example deviations by no more than 50°, particularly preferably by no more than 20° and in particular by no more than 5°. In principle, however, other angle deviations are also possible.

The grating may act as a flow straightener upstream from the sensor element. For example, the grating may include a plastic grating. The grating may be designed, for example, as a mesh grating, in particular as a mesh grating having a mesh width of 4 mm to 8 mm. The grating may be positioned, for example, at a distance between 10 mm and 50 mm from the sensor.

In contrast to the gratings known from the related art, the grating used according to the present invention for implementing the basic idea of the present invention described above has at least one grating bar having an improved cross section. In particular, this improvement lies in the fact that at least one shearing element is provided on at least one surface of the bar over which the fluid medium flows. This shearing element is designed to produce a region having a turbulent flow in the flow downstream from the shearing element. These layers having high velocity gradients, in particular transversely to the main flow direction, form additional shearing layers which are highly unstable. Due to the flow fluctuations generated thereby, the wake downstream from the grating bar is excited, i.e., caused to oscillate, and it becomes turbulent at high frequency very early, i.e., already at very low flow velocities. As a result, the flow transition from laminar to turbulent flow may be shifted to a great extent toward low flow velocities. Therefore, the flow at the sensor is turbulent over nearly the entire operating area.

The at least one shearing element may have, in particular, at least one shoulder in its surface which is situated transversely to the main flow direction, i.e., for example, parallel to the longitudinal extension of the bar. This shoulder may be designed, in particular, to have a sharp edge. The shearing element may be provided, in particular, on two diametrically opposed surfaces of the bar, the bar having, for example, an essentially symmetrical cross section.

Downstream from the shearing element, for example downstream from the shoulder, which may have a stepped design, the bar may have a narrowed extension, i.e., an area of the bar in which the latter's cross section is narrower than it is at least in the area of the shoulder and preferably narrower than in the remaining area of the grating bar. This extension may be tapered, for example, in the main flow direction. Thus, the extension may have, for example, a chamfer relative to an axis of symmetry of the bar. For example, a taper angle $\alpha$, i.e., an angle between the chamfer and the axis of symmetry, between 0° and 10° may be used.

Upstream from the shearing element, thus for example upstream from the shoulder, the bar may have an approach section having a rounded cross section. This approach section may have, for example, essentially a wedge shape, the tip of the wedge pointing against the main flow direction. This tip may have a rounded design. The wedge surfaces of the wedge shape may have either a planar or a curved design. However, other shapes are possible as alternatives to a wedge shape, for example a U shape, a wing shape, or another rounded or curved shape.

As described above, the grating may be designed, in particular, as a cross grating having at least two, preferably more, bars which cross each other at at least one crossing point. The bars may cross each other at a right angle or also at an angle which deviates from a right angle.

In a preferred specific embodiment, the bars may each have a recess at least downstream in the area of the crossing points, in which the bar depth, i.e., the depth of the bars along their axis of symmetry, is reduced. This recess according to the present invention in the area of the crossing points results, in principle, in two effects. Thus, the velocity profile becomes more homogeneous and more stable due to a local reduction in the wall influence. The separation zones downstream from the grating bars become smaller. In the proposed recesses, longitudinal vortices are furthermore generated for greater exchange of pulses between the slow fluid medium (in the separation zone) and the fast fluid medium (outside the separation zone) downstream from the bars. This also reduces the size of the separation zones and stabilizes them, and the velocity profile is made more homogeneous overall. This specific embodiment of the present invention is thus also aimed at equalizing the flow and increasing signal reproducibility in the sensor system.

DETAILED DESCRIPTION OF THE INVENTION

Figure 1A:
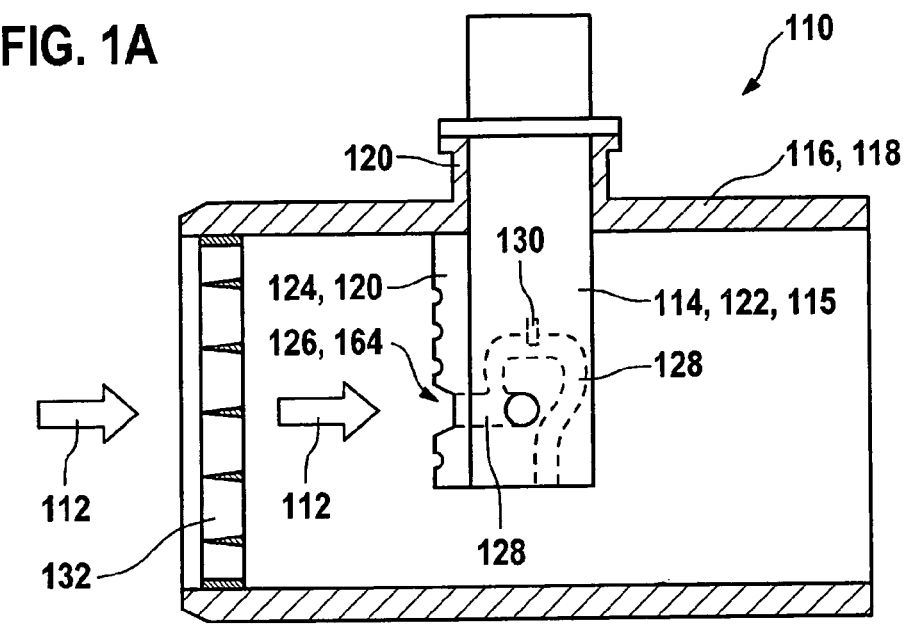
FIGS. 1A and 1B show different representations of a possible exemplary embodiment of a sensor system.
Figure 1B:
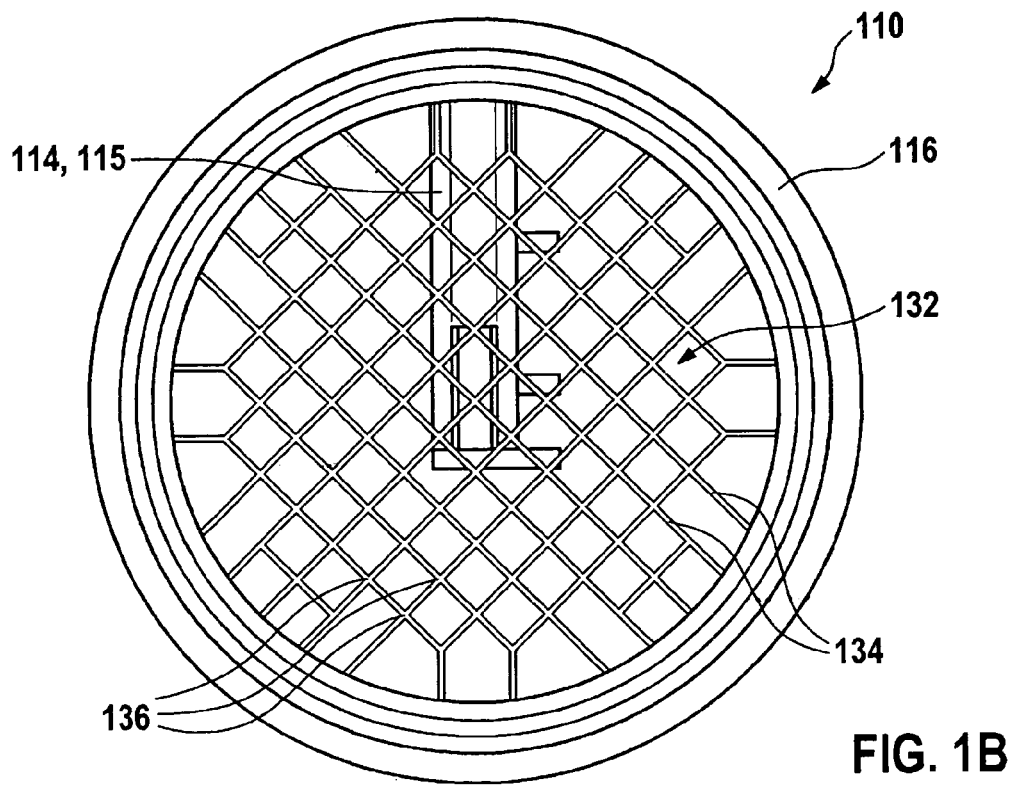

FIGS. 1A and 1B show a sensor system 110, which is known from the related art and which is available, for example, commercially (e.g., in the form of a hot film air mass meter of the "HFM7" type from Robert Bosch GmbH) and which may be modified according to the present invention within the scope of the present invention. FIG. 1A shows a sectional representation of sensor system 110 viewed from the side, while FIG. 1B shows sensor system 110 viewed from the front, along a main flow direction 112 of a flowing fluid medium.

Reference is hereby made to the related art for exemplary embodiments of the structure of sensor system 110. Sensor system 110 in this exemplary embodiment is designed as a hot film air mass meter sensor system and has a hot film air mass meter 114. As described above, however, other types of sensors may be provided as an alternative or in addition.

Sensor system 110 may include a flow tube segment 116 having a housing 118. Housing 118 has a receptacle 120 into which a measuring probe 122 of hot film mass meter 114 may be inserted. Receptacle 120 is designed in such a way that it includes an inflow edge 124 on the inflow side of measuring probe 122, for the design of which, for example, reference is again made to the related art. An inlet 126 in the form of an opening is introduced into inflow edge 124. Within measuring probe 122, this inlet 126 is adjoined by a flow channel 128 in which a sensor element 130 is situated. For example, reference may again be made to the related art for the design of flow channel 128 and sensor element 130, which determine the functionality of hot film air mass meter 114. All elements are indicated only schematically in FIGS. 1A and 1B.

As is apparent, in particular, in FIG. 1B, flow pipe segment 116 of sensor system 110 furthermore has a grating 132 situated upstream from measuring probe 122. In the present exemplary embodiment, this grating 132 is designed as a mesh grating having a plurality of bars 134 which cross each other in an essentially perpendicular manner in this exemplary embodiment. These bars 134 cross each other at a plurality of crossing points 136. The grating may be designed, for example, as a round individual part which is removable from flow pipe segment 116, for which purpose, for example, a groove may be provided on the inlet side of flow pipe segment 116 for accommodating grating 132. Grating 132 and flow pipe segment 116 and parts of measuring probe 122 may be designed, for example, entirely or partially as plastic components, and they may include, for example, a polyamide and/or a polybutylene terephthalate as the material, in particular having a fiberglass filling of 30%.

Bars 134 of grating 132 are indicated only schematically in FIGS. 1A and 1B. In different exemplary embodiments, FIGS. 2 through 5 illustrate how this grating 132 and bars 134 may be modified according to the present invention.

Figure 2:
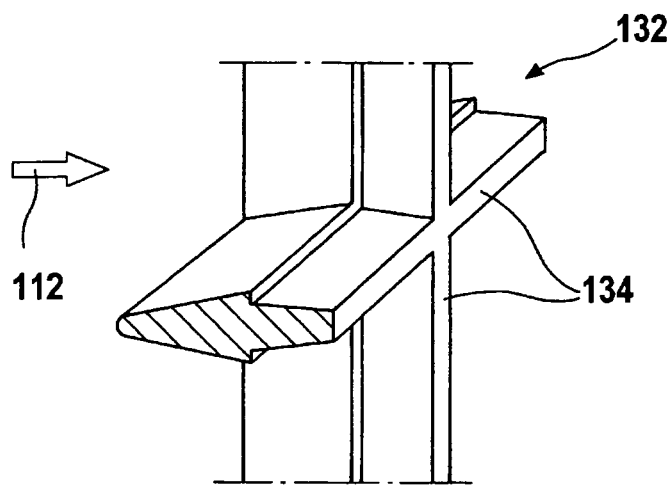
FIG. 2 shows a perspective detailed representation of an exemplary embodiment of a grating according to the present invention.
Figure 3:
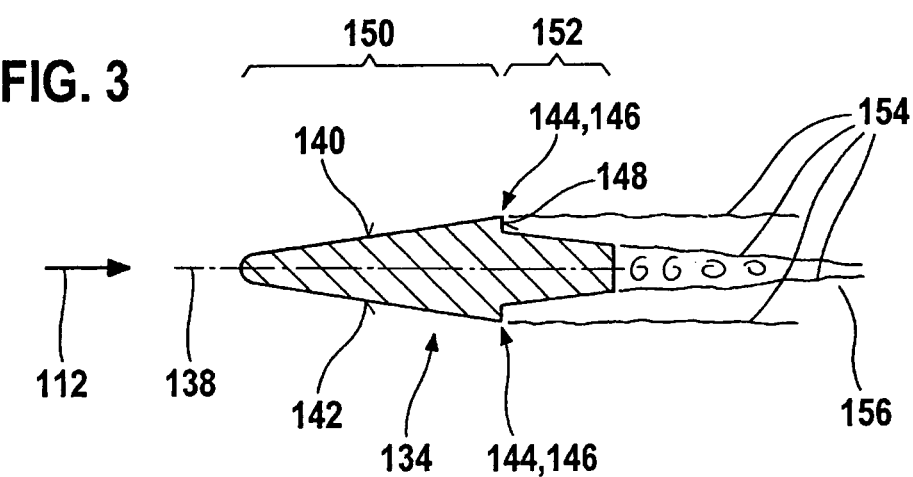
FIG. 3 shows a cross section of a bar of the grating according to FIG. 2, including a representation of the circulating flow properties through the fluid medium.
Figure 4:
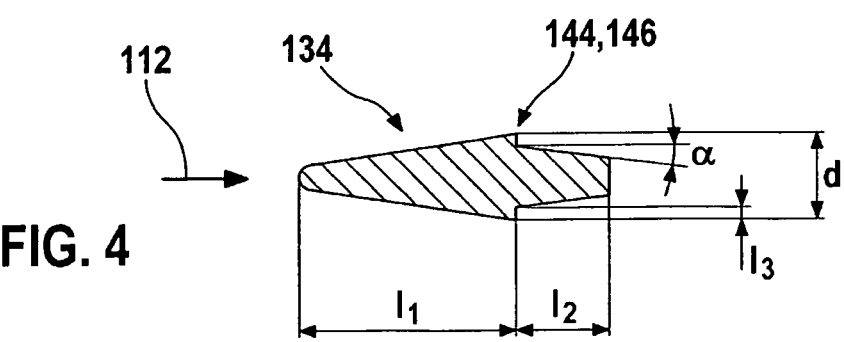
FIG. 4 shows the grating bar according to FIG. 3 having preferred dimensions.

Thus, FIGS. 2 through 4 show a first exemplary embodiment of a specific embodiment of grating 132 according to the present invention. Grating 132 is designed as a cross grating having bars 134 which cross each other, for example, at right angles. In horizontally running bar 134 shown in the perspective sectional representation in FIG. 2, it is apparent that this bar has a profile having an at least approximately optimized cross section. This cross section is illustrated in greater detail in FIGS. 3 and 4, FIG. 3 showing an illustration of the flow conditions around grating bar 134 and FIG. 4 showing preferred dimensions. In the exemplary embodiment according to FIG. 2, it is apparent that both horizontal bars 134 and vertical bars 134 have the cross section according to the present invention. Alternatively, however, only individual bars 134 may have a cross section of this type, for example only the horizontal bars or the vertical bars or only some of bars 134, for example only every second bar 134.

As shown, for example, in FIG. 3, bars 134 are oriented, for example, parallel to main flow direction 112, i.e., an orientation in which an axis of symmetry 138 of bars 134 is oriented at least approximately parallel to main flow direction 112. As described above, however, other orientations of bars 134 are also possible, for example orientations at a pitch. Furthermore, the bars in the figures have a symmetrical profile to axis of symmetry 138. Again, this is not necessarily required, so that asymmetrical profiles may also be used.

Bars 134 have two surfaces 140, 142 over which the flowing fluid medium flows. A shearing element 144 in the form of a shoulder 146 is provided on each of these surfaces over which the medium flows, shearing elements 144 having an essentially identical design in the illustrated exemplary embodiment. However, this is also not necessarily required. Shoulder 146 is designed to have sharp edges and has a transverse surface 148 on its downstream side which may be situated, for example, perpendicularly to main flow direction 112 or axis of symmetry 138 or at an angle which deviates slightly from 80°, for example an angle between 70° and 110° relative to main flow direction 112 or axis of symmetry 138. Transverse surface 148 may be designed, for example, to be planar.

Shearing element 144 divides the profile of bar 134 into an approach section 150, which is situated upstream from shearing element 144, and an extension 152, which is situated downstream from shearing element 144. In the exemplary embodiment illustrated in FIG. 3, approach section 150 has a wedge shape including a rounded tip which is pointing against main flow direction 112. Extension 152, on the other hand, has a chamfer and is designed to be slightly narrower than the rest of bar 134, for example slightly narrower than bar 134 in the widest area at shearing elements 144.

FIG. 4 shows the preferred dimensions of the exemplary embodiment of bar 134 illustrated in FIG. 3. Herein, length $l_1$ designates the length of approach section 150, which may be, for example, between 3 mm and 7 mm. Length $l_2$ of extension 152 may be, for example, between 2 mm and 5 mm. The height of an individual shoulder 146, i.e., the width of transverse surface 148, which is designated $l_3$ in FIG. 4, may be, for example, between 0.05 mm and 0.2 mm. The width of bar 134 at its widest point in the area of shearing elements 144, which is designated d in FIG. 4, may be, for example, between 0.5 mm and 1.5 mm. FIG. 4 furthermore shows taper angle α, i.e., the angle of the surfaces of extension 154, which have, for example, a planar design, relative to axis of symmetry 138. This taper angle α may be, for example, between 0° and 10°.

FIG. 3 furthermore symbolically shows the flow conditions at and downstream from bar 34. It is apparent that downstream from shearing elements 144, shearing layers 154 form in which a high velocity gradient perpendicularly to main flow direction 112 and/or to axis of symmetry 138 prevails. These shearing layers 154 are highly unstable and cause flow fluctuations due to which wake 156 downstream from bar 134 is excited to oscillations and becomes turbulent at high frequency very early, i.e., already at low flow velocities.

Figure 5:
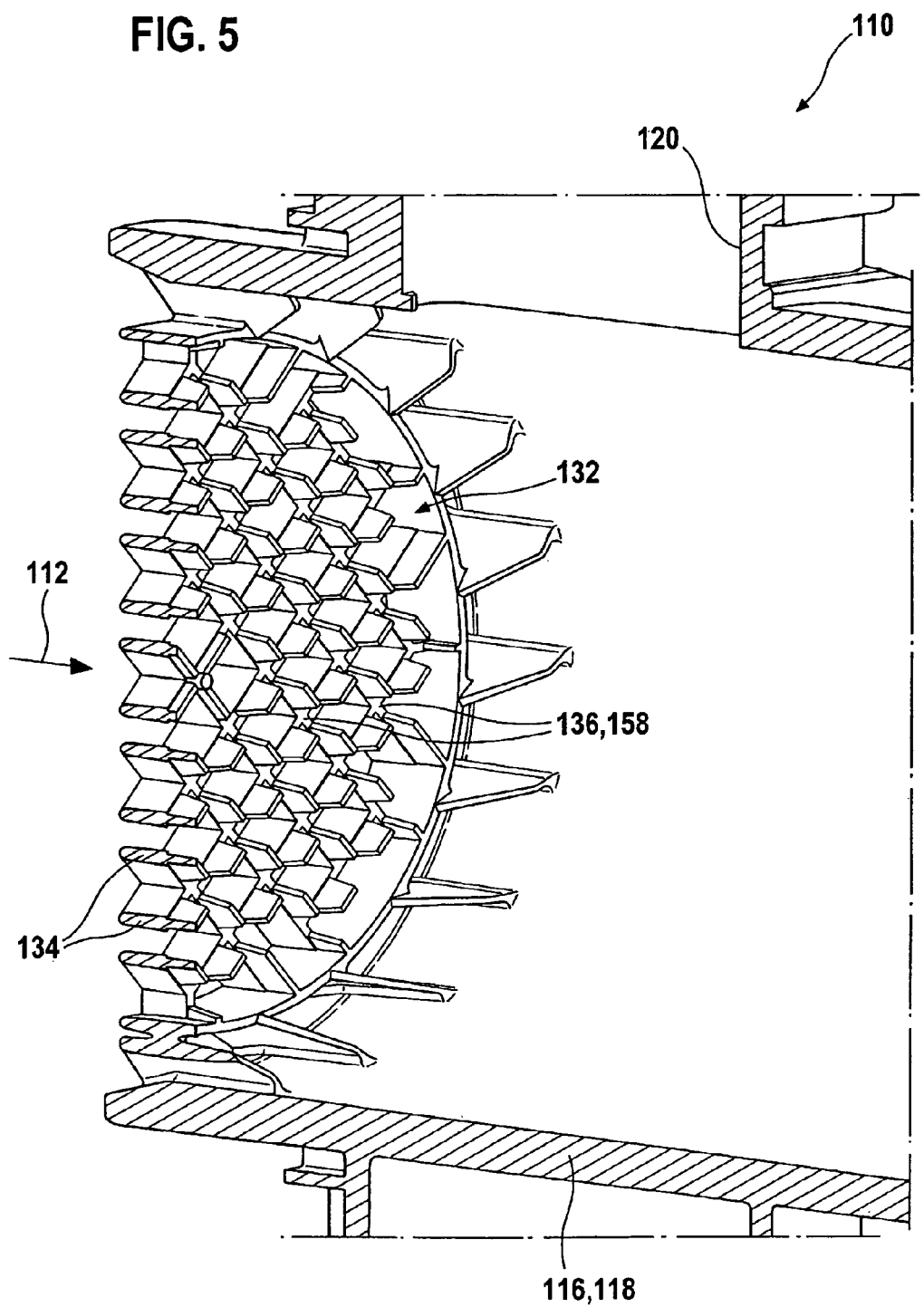
FIG. 5 shows a specific embodiment of the grating according to the present invention, including recesses at the crossing points.

The exemplary embodiment of grating 132 illustrated in FIG. 2 has bars 134 which have a uniformly constant bar depth, i.e., a longitudinal extension parallel to axis of symmetry 138. FIG. 5, on the other hand, shows a perspective representation of a section of a sensor system 110 according to the present invention, in which grating 132 has grating bars 134 which have a varying bar depth along their longitudinal extension. Thus, bars 134 of grating 132 each have recesses 158 at their crossing points 136 on their downstream sides, in which the bar depth of bars 134 is locally reduced. For example, bars 134 may be shortened by their extension 152 in the area of these recesses 158 and have only approach section 150. The depth of recesses 158, i.e., the maximum reduction in bar depth in the recesses, is preferably in the range of approximately 50 percent of the bar depth, other depths of the recess being possible, however, for example in the range between 10 percent and 80 percent of the bar depth.

Due to these recesses 158, the velocity profile of the flow of the fluid medium becomes more homogeneous and thus more stable, as shown above. The separation zones downstream from grating bars 134 become smaller. Furthermore, longitudinal vortices, which ensure a greater exchange of pulses between the slow fluid medium and the fast fluid medium within or outside the separation zone downstream from bars 134, are generated in the proposed recesses in the bars. This also reduces the size of the separation zones and stabilizes them, and the velocity profile is made more homogeneous.

What is claimed is:

1. A sensor system for determining at least one parameter of a flowing air mass flowing in a main flow direction through a flow pipe, comprising:
   at least one sensor situated in the flowing air mass for determining the parameter of the flowing air mass; and
   at least one grating situated transversely to the main flow direction and having at least one bar, wherein the at least one bar has at least one shearing element on at least one surface, the flowing air mass flowing over the at least one surface, and the shearing element includes at least one shoulder situated transversely to the main flow direction in the surface of the at least one bar for increasing flowing air mass turbulence.

2. The sensor system as recited in claim 1, wherein the at least one shoulder has an abrupt edge.

3. The sensor system as recited in claim 1, wherein the at least one bar has an essentially symmetrical cross section.

4. The sensor system as recited in claim 1, wherein the at least one bar has a narrowed extension downstream from the shearing element.

5. The sensor system as recited in claim 4, wherein the narrowed extension is tapered in the main flow direction.

6. The sensor system as recited in claim 5, wherein the narrowed extension has a taper angle between 0° and 10°.

7. The sensor system as recited in claim 4, wherein the at least one bar has a rounded approach section upstream from the shearing element.

8. The sensor system as recited in claim 7, wherein the rounded approach section has essentially a wedge shape.

9. A sensor system for determining at least one parameter of a flowing air mass flowing in a main flow direction through a flow pipe, comprising:
   at least one sensor situated in the flowing air mass for determining the parameter of the flowing air mass; and
   at least one grating situated transversely to the main flow direction and having at least one bar with at least two shearing elements situated on diametrically opposed surfaces, the flowing air mass flowing over the diametrically opposed surfaces, and the shearing element increasing a turbulent flow of the flowing air mass.

10. A sensor system for determining at least one parameter of a flowing air mass flowing in a main flow direction through a flow pipe, comprising:
    at least one sensor situated in the flowing air mass for determining the parameter of the flowing air mass; and
    at least one grating situated transversely to the main flow direction and having two bars configured as a cross grating with at least one crossing point between the two bars and at least one shearing element on at least one surface of at least one of the bars, wherein a bar depth of at least one of the bars is reduced in an area of the cross point, the flowing air mass flowing over the at least one surface, and the shearing element increasing a turbulent flow of the flowing air mass.

* * * * *